(12) United States Patent
Lee et al.

(10) Patent No.: US 6,855,357 B2
(45) Date of Patent: Feb. 15, 2005

(54) AROMA GENERATING APPARATUS AND METHOD IN A COOKING APPARATUS

(75) Inventors: Won-Woo Lee, Ansan (KR); Young-Min Hyun, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/788,348

(22) Filed: Feb. 21, 2001

(65) Prior Publication Data

US 2001/0026822 A1 Oct. 4, 2001

(51) Int. Cl.$^7$ .............................................. A01K 43/00
(52) U.S. Cl. ..................... 426/231; 426/233; 426/243; 426/312; 426/442; 426/523
(58) Field of Search ................................. 426/231, 233, 426/312, 442, 523, 237, 241–243, 520

(56) References Cited

U.S. PATENT DOCUMENTS 6,584,374 B2 * 6/2003 Lee et al. .................... 700/211

* cited by examiner

Primary Examiner—Drew Becker
(74) Attorney, Agent, or Firm—Robert E. Bushnell, Esq.

(57) ABSTRACT

Aroma generating apparatus and method is provided in a cooking apparatus having a main body formed with a cooking compartment and a cooker driver to cook a food within the cooking compartment. The aroma generating apparatus includes an aroma diffuser diffusing at least one food aroma corresponding to a cooking menu or an aroma to remove the food aroma, a keyboard providing a selection of the cooking menu, and a control part controlling the aroma generator so as to produce the food aroma or the deodorizer corresponding to the cooking menu selected by a user and release the food aroma or the deodorizer inside or outside the cooking apparatus.

34 Claims, 6 Drawing Sheets

AROMA GENERATING APPARATUS AND METHOD IN A COOKING APPARATUS

CLAIM OF PRIORITY

This application makes reference to, incorporates the same herein, and claims all benefits accruing under 35 U.S.C. §119 from my application COOKING APPARATUS AND CONTROL METHOD THEREOF filed with the Korean Industrial Property Office on Mar. 23, 2000 and there duly assigned Serial No. 14883/2000.

BACKGROUND OF THE INVENTION

1. Field of the Invention

The present invention relates to an aroma generating apparatus and method in a cooking apparatuses and, more particularly, to a cooking apparatus having an aroma generating apparatus and method capable of generating aromas corresponding to food to be cooked.

2. Description of the Related Art

Cooking fumes and smells are produced from food cooked in a cooking chamber of a cooking apparatus such as a microwave oven, an electric rice cooker using an electricity as a cooking energy source, and a gas range and a gas oven using gas as a cooking energy source. Depending on a cooking operation, smoke and gas remain in the cooking chamber and are spread around the cooking apparatus even after the cooked food is removed from the cooking apparatus.

Regarding a conventional cooking apparatus, FIG. 6 shows a microwave oven 101 having a main body 103 formed with both a cooking chamber 105 and a component chamber 107 and an external case 109 surrounding the main body 103 and defining an external appearance of the microwave oven 101. In front of cooking chamber 105 is mounted a door 111 opening and closing a front opening part of cooking chamber 105, and a control panel 113 having a keyboard 115 is installed adjacent to door 111.

A tray 117 upon which food to be cooked rests is placed on a bottom of cooking chamber 105. In component chamber 107 are housed a high voltage transformer (HVT) 119 generating a high voltage, a magnetron 123 generating electromagnetic waves by means of the high voltage generated by HVT 119, and a fan 121 drawing outdoor air into component chamber 107. When a cooking menu and cooking conditions corresponding to the cooking menu are selected by a user through keyboard 115, controller activates magnetron 123 to generate the electromagnetic waves and supplies the generated electromagnetic waves to cooking chamber 105, thereby cooking the food placed in cooking chamber 105.

This conventional microwave oven, however, is not provided with a function of supplying a food aroma corresponding to the cooking menu and removing the food aroma generated during cooking the food. Therefore, the user can not smell the food being cooked in the microwave oven before the food is cooked. Moreover, the user feels unpleasant when smoke and gas remain around the microwave oven after cooking operation.

In consideration of the tendency of many consumers preferring a cooking apparatus having various and supplementary functions or being easy to use, a microwave oven is needed to be equipped with an aroma generating device for diffusing a variety of aromas corresponding to a selected food in order to stimulate the user's appetite while the user is waiting the food cooked. In addition, if the food aroma remained in and around the microwave oven after cooking operation can be removed, the air dispersed around and contained in the microwave oven can be maintained more pleasantly to the user. Furthermore, if an aroma good for a human beings health is generated while the microwave oven is in no operation, this would serve to improve our health.

SUMMARY OF THE INVENTION

It is an object of the present invention to provide a cooking apparatus having an aroma generating apparatus and method capable of generating aromas corresponding to foods to be cooked.

It is another object to provide a cooking apparatus and method able to diffuse aromas into a cooking chamber of the cooking apparatus after food is cooked and removed from the cooking apparatus.

It is yet another object to provide a cooking apparatus and method able to diffuse aromas for removing the smells of fumes generated when food is cooked in the cooking apparatus.

It is still another object to provide a cooking apparatus and method able to diffuse aromas outside the cooking apparatus.

It is a further object to provide a cooking apparatus and method able to diffuse aromas corresponding to food to be cooked before the food is cooked.

It is also an object to provide a cooking apparatus and method having various aroma substances mixed and diffused inside and outside the cooking apparatus.

This and other objects of the present invention may be achieved by a microwave oven including a main body formed with a cooking chamber and a component chamber having a cooking driver to cook food placed within the cooking chamber, an aroma generator having an aroma diffuser diffusing either at least one food aroma corresponding to a cooking menu or a smell remover as a deodorizer removing fumes produced from the food during a cooking operation, a keyboard providing a selection of the cooking menu, and a controller controlling the aroma generator so as to produce the food aroma or the smell remover corresponding to the cooking menu selected by the keyboard.

The aroma generator includes an aroma storage part storing the food aroma or the removing aroma therein or a plurality of aroma storage parts storing a plurality of aroma substances which are mixed to produce the food aroma or the smell remover corresponding to the selected cooking menu, a first valve installed at an outlet port of the aroma storage parts to control the amount of each aroma substances to be mixed, an aroma diffuser having at least one diffusing nozzle through which the food aroma or the smell remover is diffused outside or inside the microwave oven, diffusing nozzles diffusing the food aroma or the smell remover to anyone of either the outside of the main body and the inside of the cooking chamber, an outside diffusing hole through which the food aroma or the smell remover is diffused to the outside of the main body, an inside diffusing hole formed at a sidewall of the cooking chamber to diffuse the food aroma or the smell remover into the cooking compartment.

The aroma diffuser includes a cylinder to which the diffusing nozzle is connected, an inlet port connected to the aroma storage part, a piston accommodated within the cylinder and reciprocating between a first diffusing position to diffuse the food aroma or the smell remover to the outside of the microwave oven and a second diffusing position to diffuse the food aroma or the smell remover into the cooking compartment, and a driving means for allowing the piston to reciprocate within the cylinder, a nozzle control valve to control the amount of the food aroma or the smell remover diffused from the cylinder is installed between the diffusing nozzle and the cylinder. The food aroma is diffused for a predetermined period of time after the cooking menu is selected while the smell remover to remove the food aroma is diffused after cooking of the cooking menu selected through the keyboard is finished.

According to another aspect of the present invention, these and other objects may also be achieved by a method of controlling a cooking apparatus including a main body formed with a cooking chamber and a component chamber having a cooker driver to cook a food within the cooking chamber, the method including the steps of preparing at least one food aroma corresponding to a cooking menu or at least one smell remover removing the fume, selecting the cooking menu, diffusing the food aroma or the smell remover corresponding to the cooking menu selected through the keyboard, producing the food aroma or the smell remover by mixing a plurality of aroma substances, and diffusing the food aroma for a predetermined period of time after the cooking menu is selected, the food aroma diffused increasingly by degree, and intermittently after the cooking menu is selected, the food aroma diffused when the cooking menu is initially selected and when a cooking operation for the selected cooking menu is finished while the removing aroma is diffused after cooking.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, and wherein.

DETAILED DESCRIPTION OF THE PREFERRED EMBODIMENTS

Figure 1:
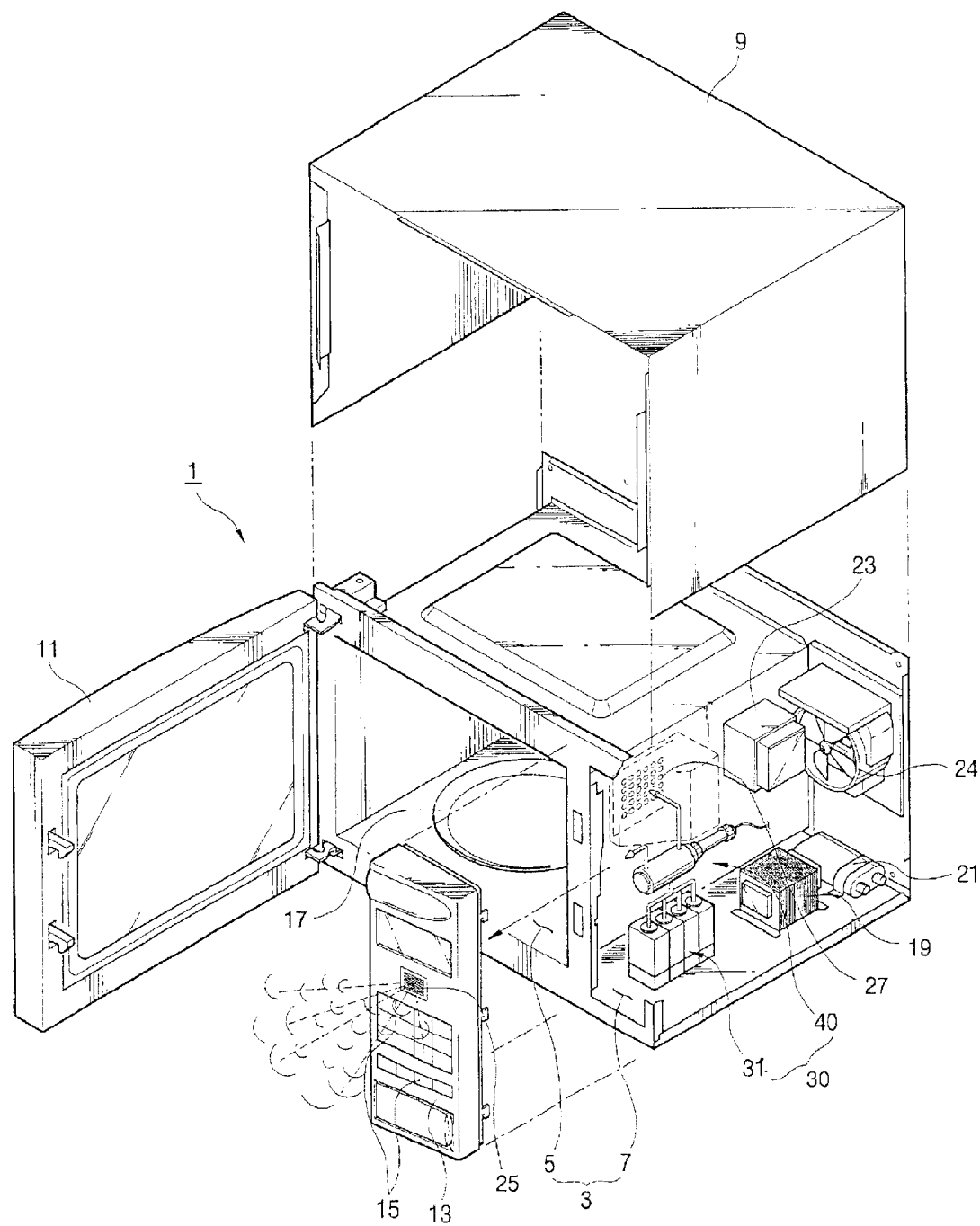
FIG. 1 is a perspective view of a microwave oven according to the present invention.

Referring to FIGS. 1 through 4, a microwave oven 1 according to the present invention include a main body 3 formed with a cooking compartment 5 and a component chamber 7, and an external case 9 enclosing main body 3 and defining an external appearance of microwave oven 1. In front of cooking chamber 5 is mounted a door 11 opening and closing a front opening part of cooking chamber 5, and a control panel 13 having a keyboard 15 is provided adjacent to door 11 and in front of component chamber 7.

A tray 17 upon which food to be cooked is placed is provided on the bottom of cooking chamber 5. Component chamber 7 accommodates therein a high voltage transformer (HVT) 19 generating a high voltage with an external power, and a high voltage condenser (HVC) 21 storing the high voltage generated by the HVT 19, a magnetron 23 generating electromagnetic waves by means of the high voltage generated by the HVT 19, and a fan 24 drawing an external air into component chamber 7.

An aroma generator 30 produces a variety of food aromas to provide the smell of a cooked food and a variety of smell removers as deodorizers to remove or mask the smells of fumes produced from the food during a cooking operation, and a control part 60 activates magnetron 23 when a cooking menu is selected by operating keyboard 15 and controls aroma generator 30 so that food aroma corresponding to the selected cooking menu can be generated. Keyboard 15 has functions of selecting cooking menus and cooking conditions and generating a food aroma corresponding to the selected cooking menu.

Figure 2:
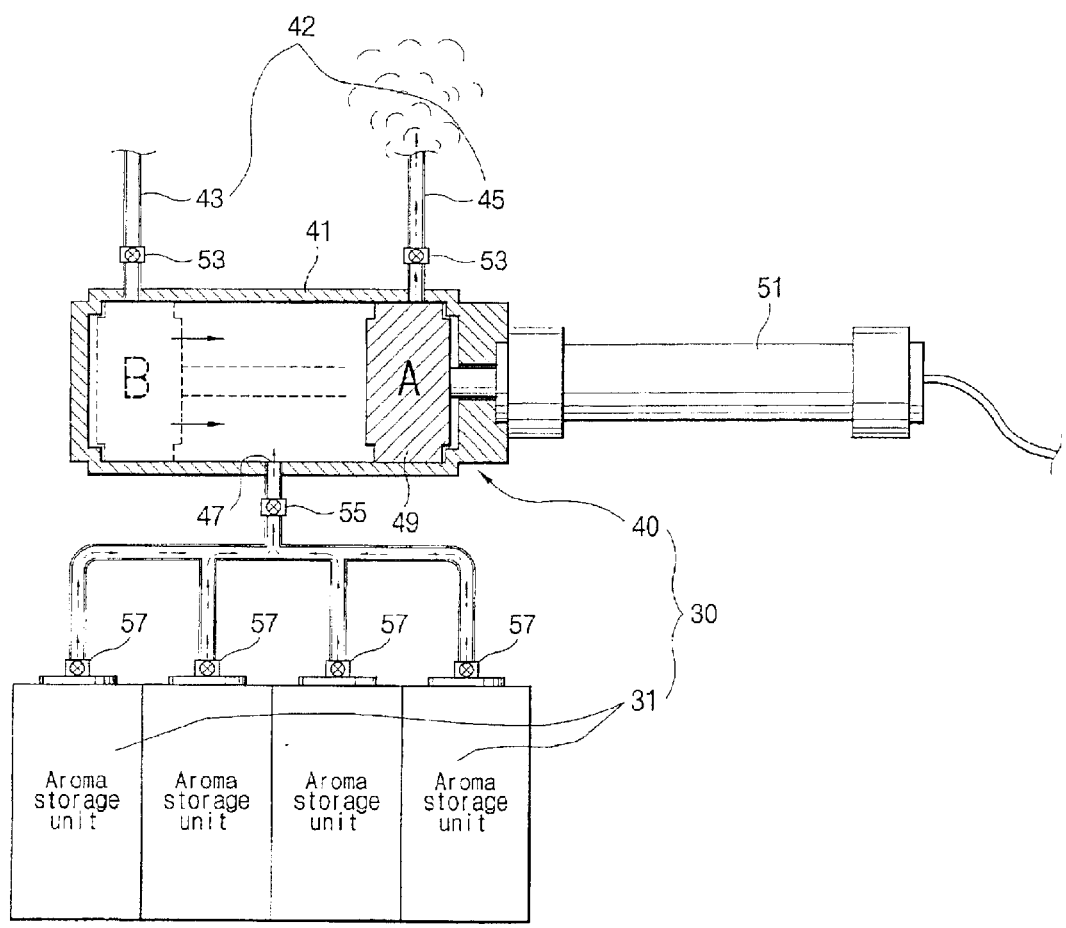
FIGS. 2 and 3 are enlarged sectional views showing operation states of an aroma diffuser of FIG. 1.
Figure 3:
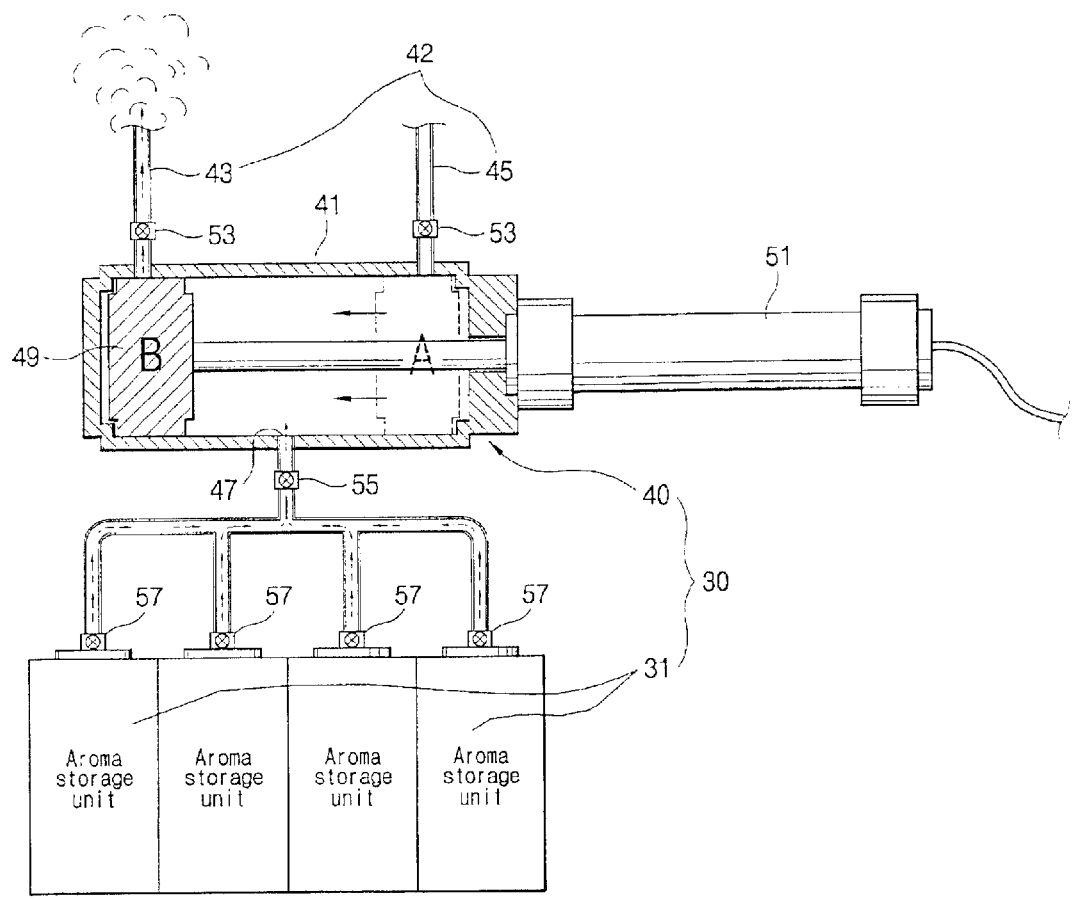
Figure 4:
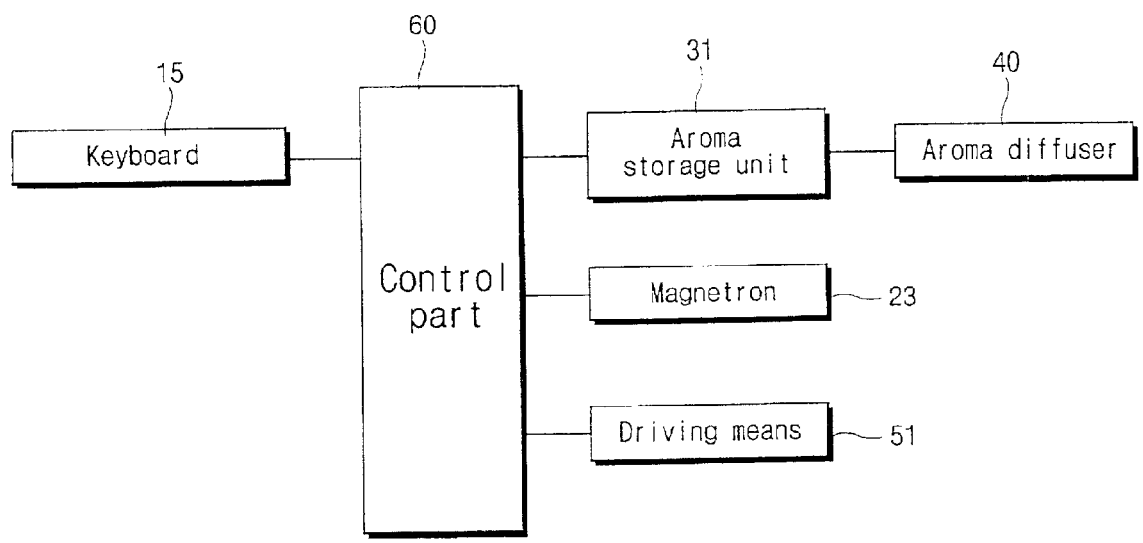
FIG. 4 is a block diagram of a control part according to the present invention.

As shown in FIGS. 2 and 3, aroma generator 30 includes a plurality of aroma storage units 31 as aroma reservoirs for producing a plurality of food aromas and smell removers corresponding to the variety of foods to be cooked and for containing a plurality of aroma substances in a molecular state to produce each food aroma and smell remover. An aroma diffuser 40 coupled to aroma storage units 31 diffuses the food aromas and smell remover stored and produced from aroma storage units 31. Depending upon any combination of aroma substances, food aromas and smell removers are produced from aroma storage units.

Each aroma storage unit 31 contains the respective aroma substance to produce the food aromas and the smell remover therein. At an outlet port for a passageway of each aroma substance is mounted first valves 57 for controlling an amount of the aroma substances to be mixed depending upon the selected cooking menu. Valves including a solenoid valve can be used as first valve 57. The solenoid valve is connected to and controlled by control part 60. A plurality of conduits are coupled between a second valve 55 and first valves 57.

The aroma diffuser 40 as a mixer mixing aroma substances includes an inlet port 47 connected to the aroma storage units 31 through first valves 57, the conduits, and second valve 55, a cylinder 41, a pair of diffusing nozzles 42 coupled to cylinder 41 and opposite to inlet port 47 and diffusing a food aroma contained inside cylinder 41 through diffusing nozzles 42 according to a selected cooking menu, and a driving means 51 coupled to a piston 49 reciprocating within cylinder 41. Second valve 55 is connected between inlet port 47 and conduits and controls the amount of a food aroma and smell remover to remove the food aroma, both of which are produced by combination of the aroma substances and diffused from aroma storage units 31 into cylinder 41 through second valve 55 and first valves 57. Aroma substances released from aroma storage units 31 are mixed between diffusing nozzles 42 and aroma storage units 31 to produce the food aroma or the small remover.

The diffusing nozzles 42 includes an outside diffusing nozzle 43 and an inside diffusing nozzle 45. Outside diffusing nozzle 43 diffuses the food aroma and the smell remover according to the selected cooking menu toward the outside of main body 3, and the inside diffusing nozzle 45 diffuses the food aroma and the smell remover into the inside of the cooking chamber. Nozzle control valves 53 to control the amount of the food aroma and the smell remover are installed in the diffusing nozzles 43 and 45. A variety of valves including a solenoid valve can be employed as nozzle control valves 53.

A first diffusing hole 25 is formed on a planar surface of control panel 13 and connected to outside diffusing nozzle 43 for diffusing outside microwave oven 1 the food aroma and the smell remover diffused by outside diffusing nozzle 43. A plurality of second diffusing holes 27 formed on a sidewall of cooking chamber 5 for diffusing into cooking chamber 5 the food aroma and the smell remover diffused by inside diffusing nozzle 45.

Piston 49 accommodated in cylinder 41 reciprocates within the cylinder 41 by driving means 51 connected to control part 60 and between a first diffusing position A for connecting inlet port 47 to outside diffusing nozzle 43 and a second diffusing position B for connecting inlet port 47 to inside diffusing nozzle 45.

Figure 5:
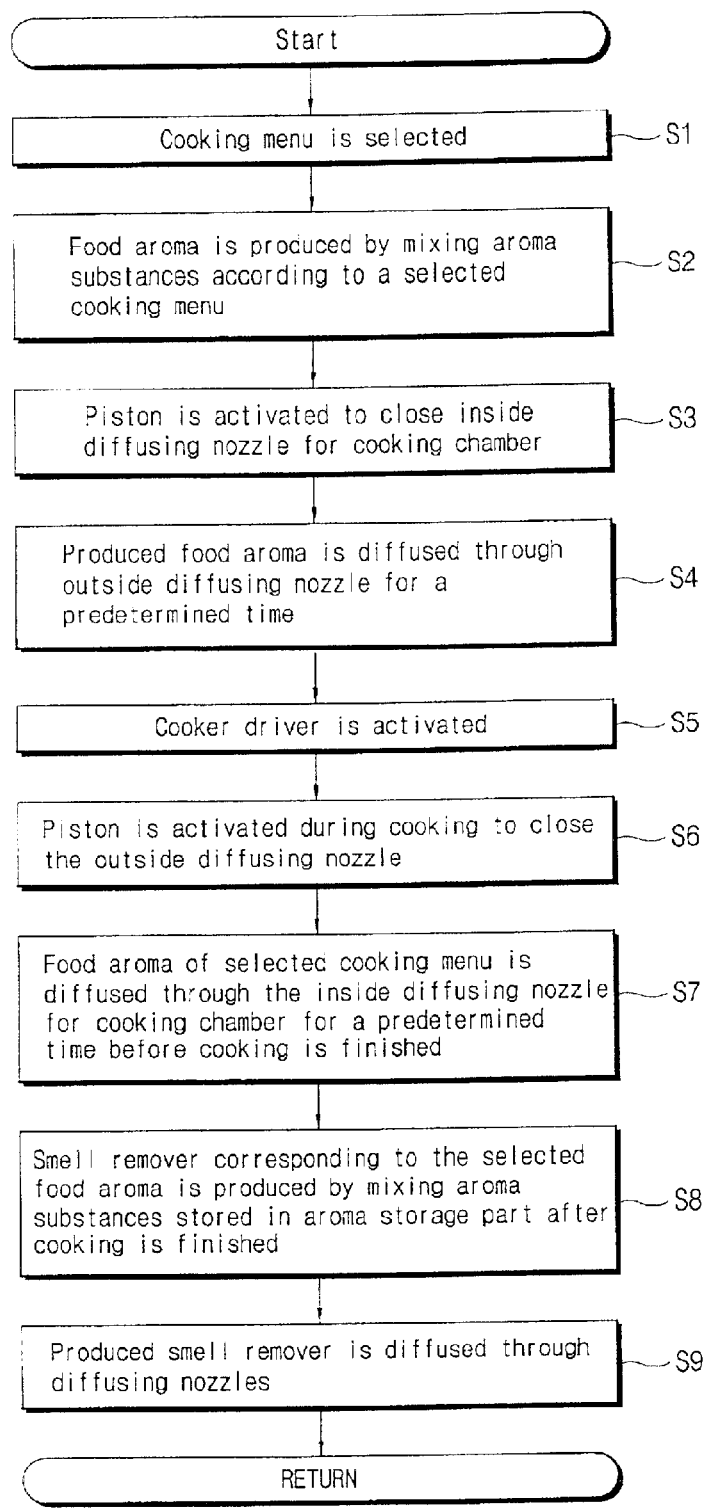
FIG. 5 is a flow chart showing a method controlling a microwave oven according to the present invention.
Figure 6:
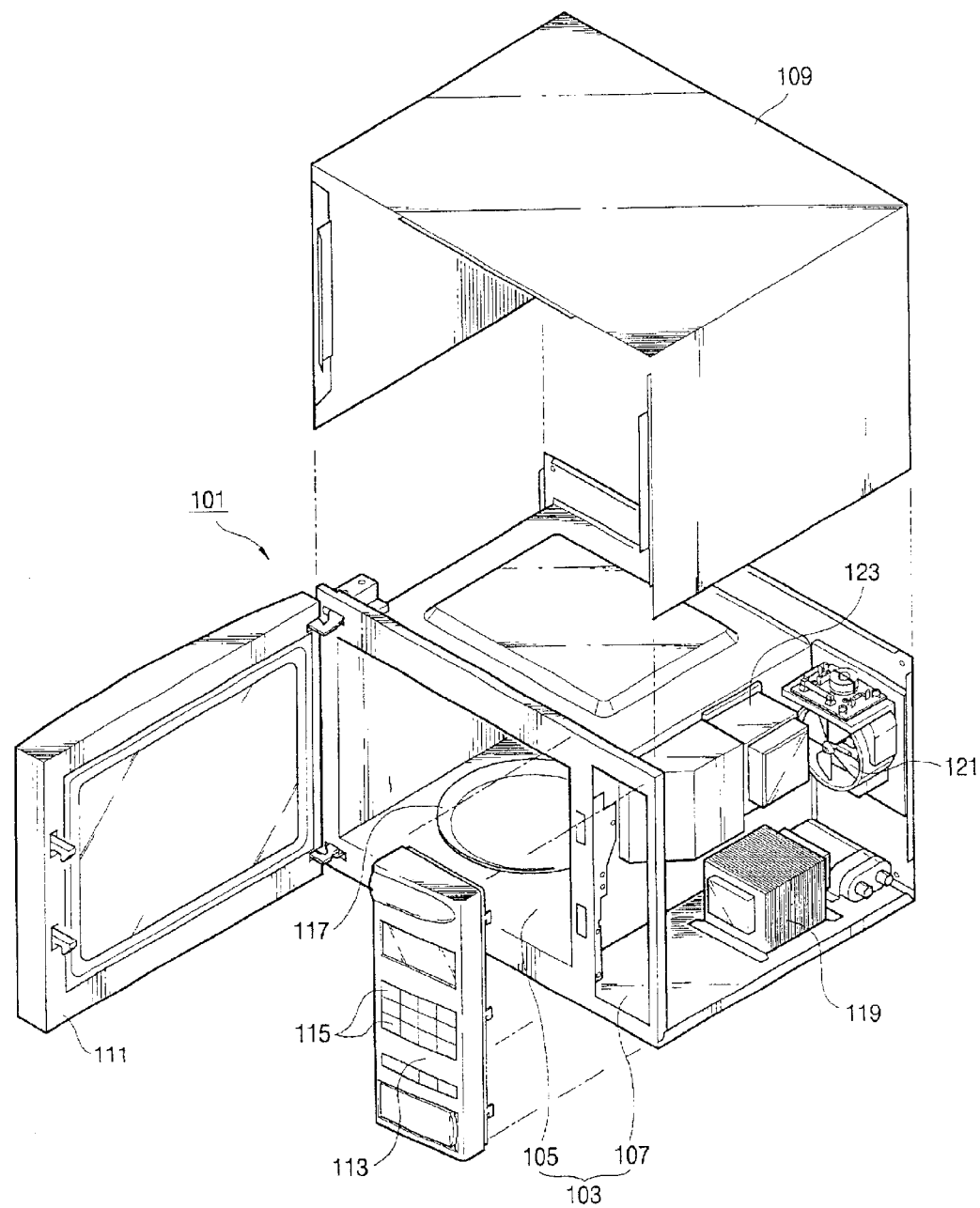
FIG. 6 is a perspective view of a conventional microwave oven.

Referring to FIG. 5, a method for controlling a microwave oven according to the present invention will be described in more detail. A cooking menu is selected through keyboard 15 provided on control panel 13 (S1). Control part 60 controls driving means 51, nozzle control valve 53, second valve 55, and first valves 57, and produces a food aroma according to the selected cooking menu by appropriately mixing the aroma substances stored in aroma storage unit 31 (S2). If the food aroma is supposed to be produced from the aroma substances, control part 60 activates driving means 51 to move piston 49 of aroma diffuser 40 to first diffusing position A. As piston 49 is moved to first diffusing position A, inside diffusing nozzle 45 is closed, and outside diffusing nozzle 43 is communicated with inlet port 47 (S3). If inside diffusing nozzle 45 is closed by piston 49, the food aroma produced by mixing the aroma substances is diffused toward the outside of main body 3 through outside diffusing nozzle 43 for a predetermined period of time (S4).

Control part 60 can control outside diffusing nozzle 43 so as for the produced food aroma to be diffused increasingly or intermittently. Control part 60 can also control outside diffusing nozzle 43 so as for the food aroma to be diffused only when the cooking menu is initially selected or when cooking for the selected cooking menu is finished. While control part 60 activates outside diffusing nozzle 43 to release the food aroma outside, magnetron 23 is operated to cook the food placed in the cooking chamber (S5). While magnetron 23 is in operation, control part 60 drives the driving means 51 so as to allow the piston 49 of aroma diffuser 40 to move the second diffusing position B and closes outside diffusing nozzle 43 (S6). After the outside diffusing nozzle 43 is closed, and inside diffusing nozzle 45 is communicated with inlet port 47, control part 60 activates inside diffusing nozzle 45 to release the food aroma produced according to the selected cooking menu toward the food placed in cooking chamber 5 for a predetermined time (S7).

Depending on a selection of a cooking menu, the aroma is decided by control part 60, produced by aroma generator 30, and released through diffusing nozzle 42. For example, the food cooked in cooking chamber 5 is a fish, the aroma having a fish cooking smell will be released. The fish cooking smell varies by the selection of one of a kind of the fishes. If beef or chicken is the selection of the cooking menu, beef cooking smell or chicken cooking smell will be released.

When it is determined that cooking is finished, control part 60 produces a deodorizer as bad smell remover to remove or mask the food aroma or non-agreeable smell corresponding to the selected cooking menu by combination of the aroma substances stored in the aroma storage units 31 (S8). The produced aroma for removal of the food aroma is diffused to the outside of main body 3 and into cooking chamber 5 through outside diffusing nozzle 43 and inside diffusing nozzle 45 by moving piston 49 to position A or position B (S9), respectively. Thus, the food aroma remaining inside the cooking chamber 5 and dispersed outside main body 3 is removed or masked.

The diffusing nozzles 43 and/or 45 can be rotatably mounted on aroma diffuser 40 to change diffusing directions of the food aroma and the smell remover. Food aroma diffusing nozzles to diffuse only the food aroma can be separately provided for outside diffusing nozzle and inside diffusing nozzle. Deodorant diffusing nozzles to diffuse only the smell remover to remove the food aroma can be separately provided for outside diffusing nozzle and inside diffusing nozzle.

An aroma to maintain the inside of a cooking chamber 5 fresh can be produced by mixing the aroma substances stored in the aroma storage unit 31 during non-cooking operation of microwave oven 1. Although an aroma to remove the food aroma is produced by mixture of the aroma substances and diffused, the food aroma can be removed by providing a deodorizing filter deodorizing the remaining food aroma and a fan blowing the food aroma toward the deodorizing filter.

As described above, the aroma generator of the cooking apparatus according to the principle of the present invention is capable of generating a food aroma corresponding to a selected cooking menu and stimulating a user's appetite with the generated food aroma released before cooking. The food aroma remaining inside and outside the cooking chamber after completion of cooking can be removed or masked by the deodorizer or the smell remover.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method in a cooking apparatus, comprising:

storing a plurality of aroma sources in said cooking apparatus;

making a selection of a cooking menu for cooking food;

selecting an aroma corresponding to said food; and generating said aroma by mixing at least two aroma sources selected from said plurality of aroma sources stored in said cooking apparatus, said aroma not being produced by said food itself to be cooked.

2. The method of claim 1, further comprising diffusing said aroma before said food is cooked.

3. The method of claim 2, further comprising terminating the diffusion of said aroma when said food is cooked.

4. The method of claim 1, further comprising diffusing said aroma after said food has been cooked.

5. The method of claim 4, wherein said aroma removes a food aroma produced from the food cooked.

6. The method of claim 1, further comprising diffusing said aroma intermittently while said food is being cooked.

7. The method of claim 1, wherein the step of generating comprises selecting aroma sources from said plurality of aroma sources and mixing the selected aroma sources to generate said aroma.

8. The method of claim 1, further comprising:

providing a main body having a cooking chamber and a parts chamber;

providing an aroma storage unit in said parts chamber;

providing a first passageway from said aroma storage unit to an outside of said main body; and releasing said aroma through said first passageway.

9. The method of claim 8, further comprising:

providing a second passageway from said aroma storage unit to said cooking chamber; and releasing said aroma through said second passageway.

10. A method in a cooking apparatus, comprising:

providing a cooking apparatus with an aroma generating unit;

producing an aroma in said aroma generating unit;

controlling a movement of a piston disposed within said aroma generating unit, wherein said piston opens one of a first nozzle and a second nozzle and closes the other; and diffusing said aroma through the opened nozzle.

11. The method of claim 10, said step of producing comprising:

selecting a scent source;

selecting an amount of said scent source; and providing said amount of said scent source to a diffuser.

12. The method of claim 11, said step of controlling comprising moving said piston to open a first nozzle and close a second nozzle coupled to said diffuser to diffuse said aroma to an inside of said cooking apparatus.

13. The method of claim 11, said controlling comprising moving said piston to close a nozzle and open a second nozzle coupled to said diffuser to diffuse said first aroma to an outside of said cooking apparatus.

14. The method of claim 10, said producing comprising selecting a cooking menu and selecting said aroma corresponding to the selected cooking menu.

15. The method of claim 10, further comprising deodorizing said aroma.

16. The method of claim 15, said deodorizing comprising:

producing another aroma in the aroma generating unit; and diffusing said another aroma for a predetermined time.

17. The method of claim 16, said producing said another aroma comprising:

selecting another scent source;

selecting an amount of said another scent source; and providing said amount of said another scent source to a diffuser.

18. The method of claim 16, said diffusing said second another aroma comprising opening a first nozzle to diffuse said second another aroma to an inside of said cooking apparatus.

19. The method of claim 18, said diffusing said second another aroma further comprising moving said piston to open said first nozzle and close a second nozzle.

20. The method of claim 16, said diffusing said another aroma comprising opening a second nozzle to diffuse said second another aroma to an outside of said cooking apparatus.

21. The method of claim 20, said diffusing said another aroma further comprising moving said piston to close said first nozzle and open said second nozzle.

22. The method of claim 16, said diffusing said another aroma comprising opening a third nozzle to diffuse said another aroma.

23. The method of claim 22, said diffusing said another aroma further comprising rotating said third nozzle.

24. The method of claim 15, said deodorizing comprising:

blowing said aroma toward a filter; and filtering off said aroma with said filter.

25. A method of providing a scent from a cooking apparatus, comprising:

storing a plurality of scent sources in a reservoir;

selecting a cooking menu;

controlling an aroma generator according to said cooking menu to select an aroma corresponding to said cooking menu and produce said aroma by mixing at least two scent sources among the stored plurality of scent sources; and diffusing said aroma for a predetermined time.

26. The method of claim 25, said step of controlling comprising:

selecting at least two scent sources among the stored plurality of scent sources;

selecting an amount of each of said at least two scent sources; and transferring the selected amount of said at least two scent sources from said reservoir to a diffuser disposed in said aroma generator.

27. The method of claim 25, said step of diffusing comprising: of:

controlling a first nozzle to diffuse said aroma to an inside of said cooking apparatus; and controlling a second nozzle to diffuse said aroma to an outside of said cooking apparatus.

28. The method of claim 27, wherein said controlling said first nozzle and controlling said second nozzle are performed by moving a piston to open one of a first nozzle and a second nozzle and close the other nozzle.

29. The method of claim 25, further comprising deodorizing said aroma.

30. The method of claim 29, said deodorizing comprising:

controlling said aroma generator to produce another aroma; and diffusing said another aroma for a predetermined time.

31. The method of claim 30, said controlling said aroma generator comprising:

selecting at least one another scent source among the stored plurality of scent sources in response to said aroma;

selecting an amount of said another scent source in response to the amount of said aroma; and transferring the selected amount of said another scent source from said reservoir to a diffuser.

32. The method of claim 31, said transferring comprising controlling a valve of said reservoir.

33. The method of claim 30, said diffusing comprising:

controlling a first nozzle to diffuse said another aroma to an inside of said cooking apparatus; and controlling a second nozzle to diffuse said another aroma to an outside of said cooking apparatus.

34. The method of claim 33, wherein said controlling said first nozzle and controlling said second nozzle are performed by moving a piston to open one of a first nozzle and a second nozzle and close the other nozzle.

* * * * *